Oct. 14, 1924.

R. B. WASSON

RING CURVING MACHINE

Filed Aug. 13, 1921

INVENTOR
Robert B. Wasson
BY
N. J. Bissing
ATTORNEY

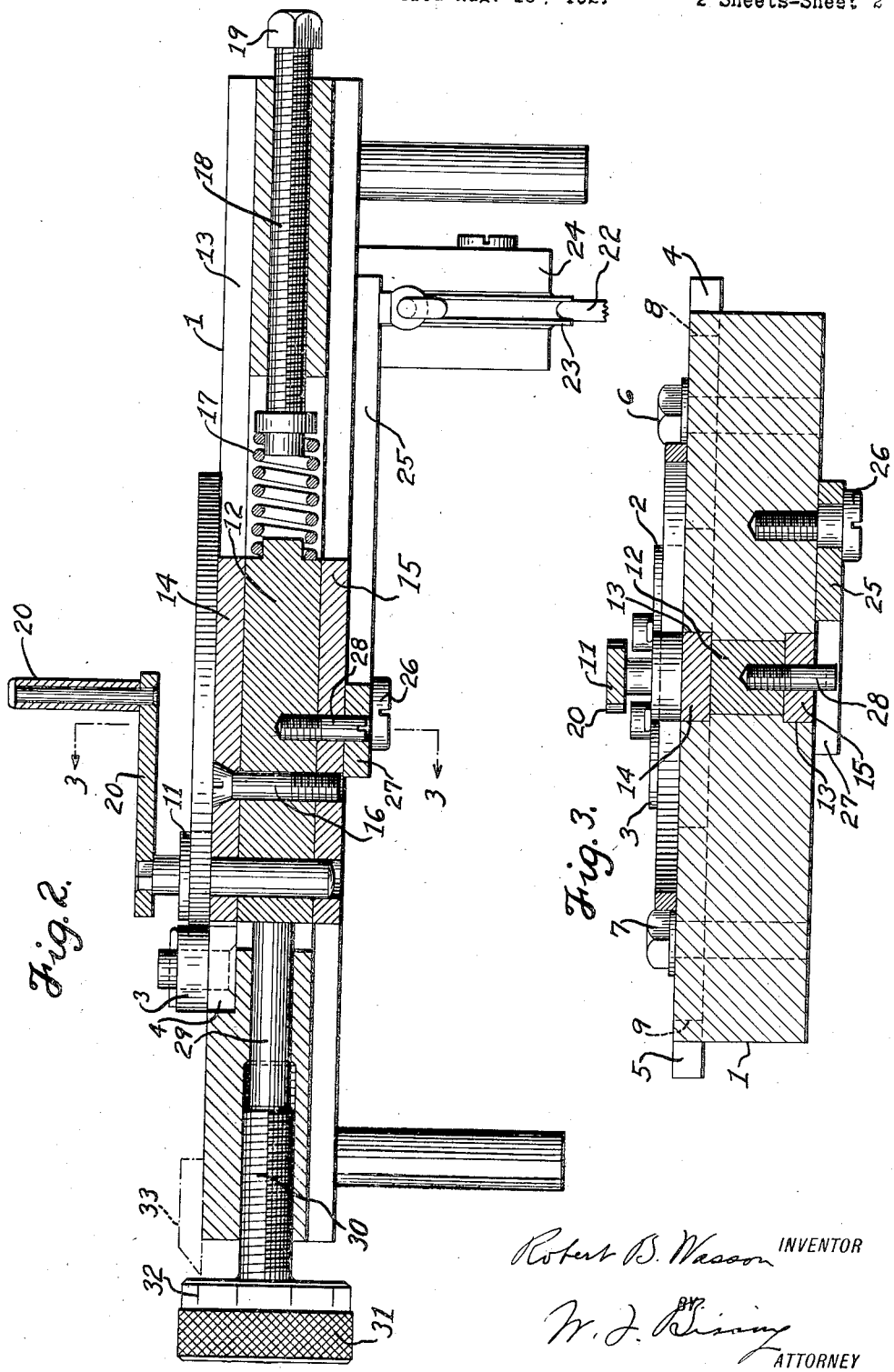

Patented Oct. 14, 1924.

1,511,547

UNITED STATES PATENT OFFICE.

ROBERT B. WASSON, OF CRANFORD, NEW JERSEY.

RING-CURVING MACHINE.

Application filed August 13, 1921. Serial No. 492,013.

*To all whom it may concern:*

Be it known that I, ROBERT BINGHAM WASSON, a citizen of the United States, residing at 306 Elizabeth Avenue, Cranford, New Jersey, have invented certain new and useful Improvements in Ring-Curving Machines, of which the following is a specification.

My invention relates to a curving machine for curving packing rings and more particularly to a machine for re-curving and thereby correcting a piston ring which has been incorrectly hammered or treated, so that the ring after re-curving obeys the correct law for giving uniform radial outward pressure.

Another object of the invention is to provide a machine which will reduce an untreated ring blank of too great a radius to the desired radius, after first splitting the ring and thereby removing a predetermined amount of metal at the split, utilizing a splitting saw of the required thickness. The ring can then be rolled into a smaller circle, its circularity being determined by a gage. This saves casting a large number of sizes of ring pots or blanks in the first instance and the subsequent machining.

Another object of my invention is to provide a ring curving machine, for curving piston rings, whose parts can be readily and quickly positioned and the machine operated without losing time, thus cheapening the cost of manufacture.

Another object of the invention is to provide such a machine in which the parts can be accurately adjusted and set to scale so as to improve the accuracy of manufacture of the ring.

With the above and other objects in view, my invention consists in the parts, improvements and combinations more fully pointed out hereinafter.

Turning now to the drawings illustrating one embodiment of the invention:

Fig. 2 is a section on line 2—2 of Fig. 1.

Fig. 3 is a cross section on line 3—3 of Fig. 2.

Figure 1:
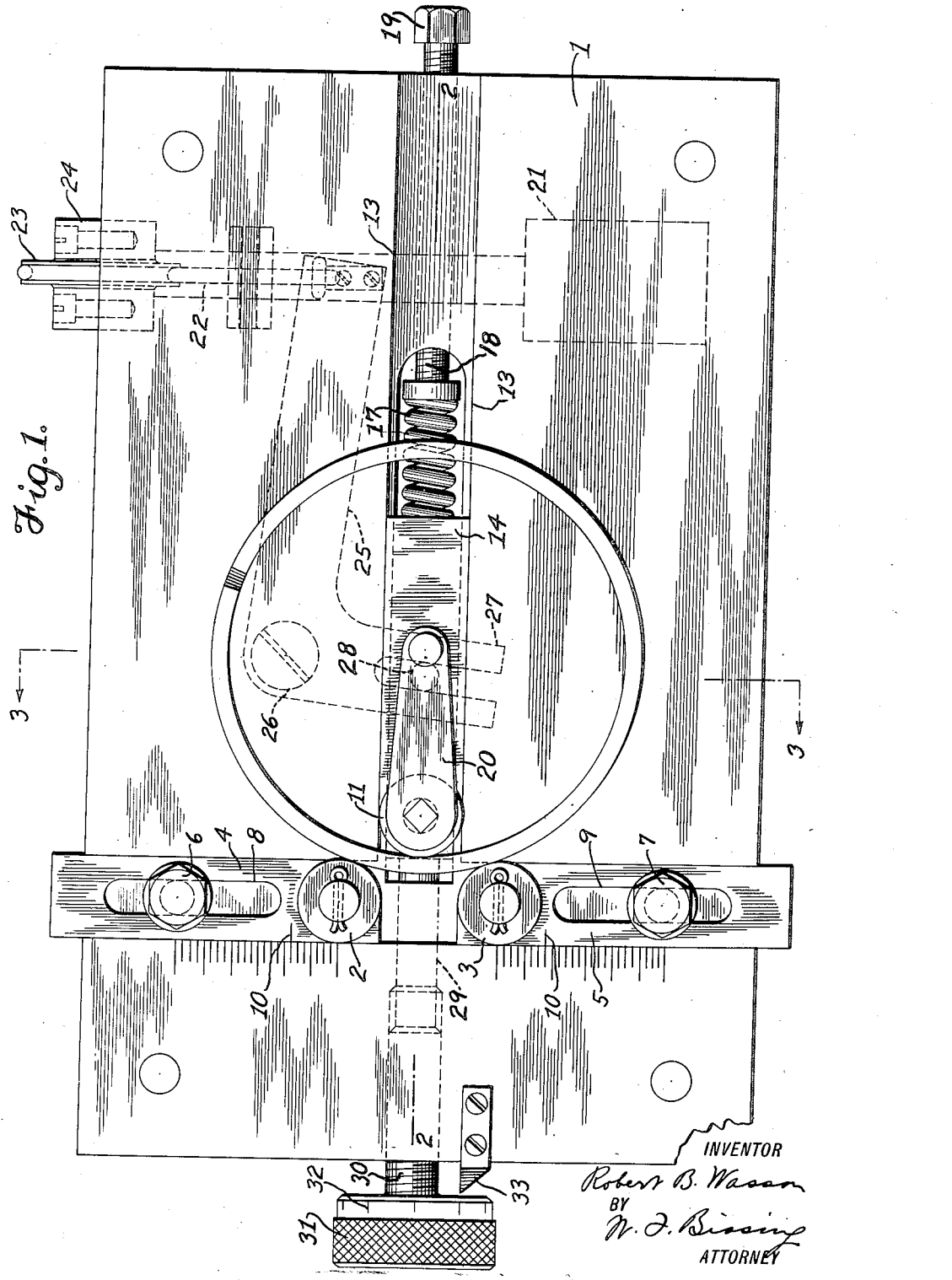
Fig. 1 is a plan view of the machine showing a split piston ring in place ready to have a portion of it re-curved.

The frame of the machine 1 is provided with a pair of ring supporting rollers 2, 3, each provided with a cylindrical contacting face. In accordance with my invention I mount these rollers respectively on slides 4 and 5 and provide means for adjusting the rollers towards and from each other. As illustrated, both of the rollers are adjustable, the slides moving in grooves in the frame and being secured in place so as to predetermine the distance between the said rollers by means of clamping bolts 6 and 7 passing thru slots 8 and 9 of the respective slides. Gage marks on the frame and a scale mark 10 on the slides enable the rollers to be accurately set.

Means are provided permitting relative movement between the pair of rollers and the pressure-applying roller. In the form of the invention illustrated a pressure-applying roller 11 having a cylindrical contacting face is mounted to move toward and from the pair of supporting rollers. The pressure roller is carried by slide 12 mounted in guides 13 of the frame. Guiding plates 14 and 15, secured to the slide block 12 by means of a set screw 16, serve to accurately guide the pressure roller.

Means are provided for applying an adjustable yielding pressure to the pressure-applying roller, which means may be varied. The yielding pressure prevents straining the ring beyond a predetermined amount. In the form of the invention illustrated I make use of a spiral spring 17 for the purpose, and compress the spring by means of a screw 18 which may be provided with a head 19. The screw is shown as mounted in the frame of the machine. It serves to adjust the pressure of the spring on the roller.

Means are provided for rotating and reversing the rotation of one of the three rollers of the re-curving set, thus rotating them clockwise and counter-clockwise. These means may be varied. In the form of the invention illustrated I provide means for rotating the pressure-applying roller and in the particular form illustrated I provide said roller with a handle 20 for rotating it. One of the rollers is thus driven positively, the remaining rollers of the set being driven by friction from the ring.

I also provide means, which may be varied, for retracting the pressure-applying roller, and in the form of the invention illustrated I make use of a pedal-operated train of mechanism for the purpose. The pedal 21 is shown as connected to the sliding block 12 which carries the pressure-applying roller by means of a flexible connector 22 passing around the pulley 23 carried by block 24 which may be secured to the frame of the machine, the said flexible connector being secured at one end to the arm of a bell-crank 25 pivoted at 26 beneath the frame of the machine, the other arm of the bell crank being forked at 27 so as to engage the pin 28, screwed into the block 12. In this way, the operator, by placing his foot upon the pedal, can open the roller jaws of the machine and retract the pressure-applying roller, thus permitting the insertion of a ring to be re-curved.

A stop is provided for limiting the motion of the pressure-applying roller towards the pair of rollers. The form of the stop may be varied and as illustrated consists of an abutment 29 which can be adjusted toward and from the slide carrying the pressure applying roller. In the form of the invention illustrated the adjusting means comprises an adjusting screw 30, the end of which is integral with the abutment, a finger wheel 31 being provided to permit ready adjustment of the screw. Gage marks 32 on the finger wheel and a pointer 33 secured to the frame of the machine enable the position of the adjusting means to be readily fixed.

Having thus described my invention, its operation is as follows, depending upon the particular result to be achieved.

A ring which, as found by gaging and testing, has been improperly treated or condensed so that it fails to give a uniform pressure reaction around its circumference, as determined by my bar gage, is inserted between the roller jaws of the machine, the pressure-applying roller being retracted by the pedal to permit the insertion. Before inserting the ring, the ring supporting rollers are correctly set by means of the gage marks, and the stop is also correctly positioned. The ring is so positioned between the jaws as to bring the portion of the ring which requires re-curving in the bite of the jaws. The handle of the pressure-applying roller is then rotated and if necessary repeatedly rotated clockwise and counter-clockwise the ring supporting rollers participating in the movement so as to roll the desired portion of the ring, until under the influence of the pressure-applying spring it has attained its correct curvature, as determined by re-gaging the ring. The cycle is repeated until the ring is correct.

When reducing an untreated ring blank to a smaller radius, I first set the pair of rollers 2, 3 of the machine so that after the ring is rolled, it will reach the desired circularity. I then place the ring blank against the pair of rollers and apply pressure thru the spring, thus bringing the pressure-applying roller home; then I rotate the rollers; then gage the ring and repeat the operation making whatever adjustments are necessary until the desired result is obtained.

From the above description of my invention it will be clear that it provides a ring re-curving machine which will quickly and readily give the desired curvature to the uncorrected part of the ring or will reduce ring blanks to a predetermined curvature.

It will be observed that many changes may be made in the construction of the parts without departing from the principle of the invention.

What I claim and desire to secure by Letters Patent is:

1. A packing ring correcting and recurving machine comprising a pair of reversibly rotatable ring supporting rollers, a support for each roller, a yielding pressure-applying roller mounted to move toward and from the said pair of rollers each of said rollers having a cylindrical contacting face and a stop limiting the motion of the pressure-applying roller towards the said pair.

2. A packing ring curving machine comprising a pair of freely rotatable ring supporting rollers driven by friction from the ring, a support for each roller, a yielding pressure-applying roller each of said rollers having a cylindrical contacting face, means permitting relative movement between the pair of rollers and the pressure applying roller and a stop limiting the said movement.

3. A packing ring curving machine comprising a pair of reversibly rotatable ring supporting rollers, a support for each roller, a yielding pressure-applying roller mounted to move toward and from the said pair of rollers each of said rollers having a cylindrical contacting face, a stop limiting the motion of the pressure applying roller toward the said pair, and means for adjusting said stop.

4. A packing ring curving machine comprising a pair of reversibly rotatable ring supporting rollers, a support for each roller, a yielding pressure-applying roller mounted to move toward and from the said pair of rollers, each of said rollers having a cylindrical contacting face, a stop for limiting the motion of the pressure-applying roller towards the said pair and a screw for adjusting said stop.

5. A packing ring curving machine comprising a pair of ring supporting rollers driven by the ring, a support for each roller, means for adjusting said rollers towards and from each other, a yielding pressure applying roller mounted to move toward and from the said pair of rollers each of said rollers having a cylindrical contacting face and a stop limiting the motion of the pressure-applying roller toward the said pair.

6. A packing ring curving machine comprising a pair of reversible ring supporting rollers, a support for each roller, means for adjusting the position of each roller so as to predetermine the distance between the said rollers, a yielding pressure-applying roller mounted to move toward and from the said pair of rollers each of said rollers having a cylindrical contacting face, a stop for limiting the motion of the pressure-applying roller towards the said pair and a screw for adjusting said stop.

7. A packing ring curving machine comprising a pair of ring supporting rollers, a slide carrying each roller, means for adjusting the position of said slides so as to predetermine the distance between said rollers, a pressure-applying roller mounted to move toward and from the said pair of rollers, means for rotating said pressure-applying roller, a stop for limiting the motion of the pressure-applying roller towards the said pair and means for adjusting said stop.

8. A packing ring curving machine comprising a pair of reversibly rotatable ring supporting rollers, a slide carrying each roller, means for adjusting the position of said slides so as to predetermine the distance between the said rollers, a yielding pressure-applying roller mounted to move toward and from the said pair of rollers, each of said rollers having a cylindrical contacting face, means for positively rotating one of said rollers, the remaining rollers being driven by friction from the ring, a stop for limiting the motion of the pressure-applying roller towards the said pair, and means for adjusting said stop.

9. A packing ring curving machine comprising a pair of ring supporting rollers, a slide carrying each roller, means for adjusting the position of said slides so as to predetermine the distance between the said rollers, a pressure-applying roller mounted to move toward and from the said pair of rollers, a handle for rotating one of said rollers, a stop for limiting the motion of the pressure-applying roller towards the said pair, and means for adjusting said stop.

10. A packing ring curving machine comprising a pair of ring supporting rollers, a support for each roller, a yielding pressure-applying roller mounted to move toward and from the said pair of rollers, a handle for driving one of said rollers, the remaining rollers of the set being driven by friction from the ring, a spring urging the pressure-applying roller towards the pair of rollers and a stop limiting the motion of the pressure-applying roller towards the said pair.

11. A packing ring curving machine comprising a pair of ring supporting rollers driven by the ring, a slide carrying each roller, means for adjusting the position of said slides so as to predetermine the distance between the said rollers, a yielding pressure-applying roller provided with a support mounted to move toward and from the said pair of rollers, a spring pressing against the support for the pressure-applying roller so as to urge it toward the pair of rollers, means for rotating one of said rollers, a stop for limiting the motion of the pressure-applying roller towards the said pair and means for adjusting said stop.

12. A packing ring curving machine comprising a pair of ring supporting rollers driven by friction from the ring, a support for each roller, a yielding pressure-applying roller mounted to move towards the said pair of rollers, means under the control of the operator for retracting the pressure-applying roller and a stop limiting the motion of the pressure-applying roller toward the said pair.

13. A packing ring curving machine comprising a pair of ring supporting rollers, a support for each roller, a pressure-applying roller mounted to move toward the said pair of rollers, a pedal for retracting the pressure-applying roller and a stop limiting the motion of the pressure-applying roller towards the said pair.

14. A packing ring curving machine comprising a pair of ring supporting rollers driven by friction from the ring, a support for each roller, a pressure-applying roller mounted to move toward the said pair of rollers, a spring urging said roller towards the said pair, means for retracting the pressure-applying roller and a stop limiting the motion of the pressure-applying roller toward the said pair.

15. A packing ring curving machine comprising a pair of ring supporting rollers, a support for each roller, a pressure-applying roller mounted to move toward the said pair of rollers, a spring urging said roller towards the said pair, a pedal for retracting the pressure-applying roller and a stop limiting the motion of the pressure-applying roller toward the said pair.

16. A packing ring curving machine comprising a pair of ring supporting rollers driven by friction from the ring, a support for each roller, a pressure-applying roller mounted to move toward and from the said pair of rollers, an adjustable spring urging the pressure-applying roller towards the pair of rollers and a stop limiting the motion of the pressure-applying roller towards the said pair.

In testimony whereof, I have signed my name to this specification, in the presence of a subscribing witness.

ROBERT B. WASSON.

Witness:
LOUELLA F. LITTLE.